US012617946B2

(12) United States Patent
Takamatsu et al.

(10) Patent No.: US 12,617,946 B2
(45) Date of Patent: May 5, 2026

(54) TOP COATING AGENT AND SILVERY-WHITE FASTENING MEMBER HAVING PROTECTIVE FILM FORMED USING SAID TOP COATING AGENT

(71) Applicants: DIPSOL CHEMICALS CO., LTD., Tokyo (JP); HONDA MOTOR CO., LTD., Tokyo (JP)

(72) Inventors: Satoshi Takamatsu, Nagareyama (JP); Hiroshi Hirayama, Tokyo (JP); Mayuko Sakashita, Tokyo (JP); Yoshiki Asaka, Tokyo (JP); Bo Tong, Tokyo (JP); Shinsuke Mochizuki, Tokyo (JP); Atsushi Murakami, Tokyo (JP); Hiroyuki Yoshida, Tokyo (JP)

(73) Assignees: Dipsol Chemicals Co., Ltd., Tokyo (JP); Honda Motor Co., Ltd., Tokyo (JP)

( * ) Notice: Subject to any disclaimer, the term of this patent is extended or adjusted under 35 U.S.C. 154(b) by 481 days.

(21) Appl. No.: 17/913,764

(22) PCT Filed: Apr. 1, 2021

(86) PCT No.: PCT/JP2021/014122

§ 371 (c)(1),
(2) Date: Jul. 10, 2024

(87) PCT Pub. No.: WO2021/201203

PCT Pub. Date: Oct. 7, 2021

(65) Prior Publication Data

US 2024/0384110 A1 Nov. 21, 2024

(30) Foreign Application Priority Data

Apr. 1, 2020 (JP) ................................ 2020-066100

(51) Int. Cl.

*C09D 5/10* (2006.01)
*B05D 1/00* (2006.01)
*B05D 3/02* (2006.01)
*B05D 5/00* (2006.01)
*B05D 5/06* (2006.01)

(Continued)

(52) U.S. Cl.

CPC ............... *C09D 5/103* (2013.01); *B05D 1/00* (2013.01); *B05D 3/02* (2013.01); *B05D 5/00* (2013.01); *B05D 5/06* (2013.01); *B05D 5/08* (2013.01); *B32B 15/08* (2013.01); *C08K 5/06* (2013.01); *C08K 9/02* (2013.01); *C08L 71/00* (2013.01); *C09C 1/40* (2013.01); *C09C 3/06* (2013.01); *C09D 5/00* (2013.01); *C09D 7/20* (2018.01); *C09D 7/45* (2018.01); *C09D 7/61* (2018.01); *C09D 7/62* (2018.01); *C09D 7/63* (2018.01); *C09D 7/65* (2018.01); *C09D 7/70* (2018.01); *C09D 171/02* (2013.01); *C09D 183/04* (2013.01); *C23C 26/00* (2013.01); *C23C 28/00* (2013.01); *C23C 30/00* (2013.01); *C23C 30/005* (2013.01); *C08G 77/04* (2013.01); *C08K 2003/0812* (2013.01); *Y10T 428/12556* (2015.01); *Y10T 428/12569* (2015.01); *Y10T 428/12799* (2015.01); *Y10T 428/12854* (2015.01)

(58) Field of Classification Search

CPC .......... C09D 171/02; C09D 7/20; C09D 7/45; C09D 7/61; C09D 7/62; C09D 7/63; C09D 7/65; C09D 7/70; C09D 5/103; C09D 5/00; C09D 183/04; C08K 5/06; C08K 9/02; C08K 2003/0812; C08K 3/08; C08L 71/00; C08L 83/04; C09C 1/40; C09C 3/06; C23C 28/00; C23C 26/00; C23C 30/00; C23C 30/005; C08G 77/04; B05D 1/00; B05D 3/02; B05D 5/00; B05D 5/06; B05D 5/08; B32B 15/08; Y10T 428/12556; Y10T 428/12569; Y10T 428/12799; Y10T 428/12854

See application file for complete search history.

(56) References Cited

U.S. PATENT DOCUMENTS

2016/0208115 A1 7/2016 Kato et al.
2017/0121540 A1 5/2017 Kato et al.
2018/0371281 A1* 12/2018 Takiguchi ........... C09D 17/006

FOREIGN PATENT DOCUMENTS

JP H06-330339 A 11/1994
JP 2006-206683 A 8/2006

(Continued)

OTHER PUBLICATIONS

International Search Report issued in PCT Application No. PCT/JP2021/014122, mailed on Jun. 15, 2021.

*Primary Examiner* — Michael E. La Villa
(74) *Attorney, Agent, or Firm* — Foley & Lardner LLP

(57) ABSTRACT

The present invention addresses the problem of providing: a top coating agent which forms a protective film demonstrating a beautiful silvery-white appearance, can be adjusted to suppress increases in the friction coefficient even when heat-treated at a high temperature, stabilizes sliding, is strong, and has excellent water resistance, corrosion resistance, and the like; and a fastening member having the protective film formed using said top coating agent. The present invention provides: a top coating agent that includes a polyoxyalkylene amine-based surfactant, a water-soluble modified organopolysiloxane, aluminum flake, and a diluent containing water; and a silvery-white fastening member having a protective film formed using said top coating agent.

9 Claims, No Drawings

(51) Int. Cl.

| | |
|---|---|
| ***B05D 5/08*** | (2006.01) |
| ***B32B 15/08*** | (2006.01) |
| ***C08K 5/06*** | (2006.01) |
| ***C08K 9/02*** | (2006.01) |
| ***C08L 71/00*** | (2006.01) |
| ***C09C 1/40*** | (2006.01) |
| ***C09C 3/06*** | (2006.01) |
| ***C09D 5/00*** | (2006.01) |
| ***C09D 7/20*** | (2018.01) |
| ***C09D 7/40*** | (2018.01) |
| ***C09D 7/45*** | (2018.01) |
| ***C09D 7/61*** | (2018.01) |
| ***C09D 7/62*** | (2018.01) |
| ***C09D 7/63*** | (2018.01) |
| ***C09D 7/65*** | (2018.01) |
| ***C09D 171/02*** | (2006.01) |
| ***C09D 183/04*** | (2006.01) |
| ***C23C 26/00*** | (2006.01) |
| ***C23C 28/00*** | (2006.01) |
| ***C23C 30/00*** | (2006.01) |
| *C08G 77/04* | (2006.01) |
| *C08K 3/08* | (2006.01) |

(56) References Cited

FOREIGN PATENT DOCUMENTS

| | | | |
|---|---|---|---|
| JP | 3128852 | U | 1/2007 |
| JP | 2008-037905 | A | 2/2008 |
| JP | 2015-045061 | A | 3/2015 |
| JP | 2002-080977 | A | 3/2022 |
| WO | WO-2015/029836 | A1 | 3/2015 |

* cited by examiner

TOP COATING AGENT AND SILVERY-WHITE FASTENING MEMBER HAVING PROTECTIVE FILM FORMED USING SAID TOP COATING AGENT

CROSS-REFERENCE TO RELATED APPLICATIONS

This application is a national phase of International Application No. PCT/JP2021/014122, filed on Apr. 1, 2021, which claims the benefit of and priority to Japanese Patent Application No. 2020-066100, filed on Apr. 1, 2020, the contents of each of which are incorporated herein by reference.

TECHNICAL FIELD

The present invention relates to a top coating agent that imparts excellent slidability, corrosion resistance, and silvery-white appearance, and a silvery-white fastening member using this top coating agent as a protective film.

BACKGROUND ART

For fastening members, friction coefficients are important for their use. Although fastening members having stable friction coefficients need to be provided, the friction coefficients of fastening members are largely affected particularly by protective films with which the surfaces of the fastening members are coated. For this reason, various friction coefficient stabilizing agents (see Japanese Patent Application Publication No. 2008-37905 and Japanese Patent Application Publication No. 2006-206683, and the like) have been used for protective films of fastening members. However, wax which has been used for stabilizing friction coefficients has a poor dispersibility, and thus there is a problem that sufficiently stable friction coefficients cannot be obtained. In addition, since films formed using top coating agents are of organic substances themselves, there is a problem that such films are susceptible to heat, and thus largely deteriorate when used in an environment where the films are exposed to a high temperature, and thus the functions as protective films for fastening members significantly deteriorate.

In order to solve these problems, a top coating agent using a film material mainly composed of a water-soluble modified organopolysiloxane has been developed (see International Publication No. WO2015/029836). Since the film formed by using this top coating agent is mainly composed of a Si—O—Si bond (siloxane bond), the film is resistant to heat, and is thus strong and stable with low deterioration even in an environment where the film is exposed to a high temperature. However, a fastening member coated with this top coating agent has a black appearance. Moreover, this top coating agent tends to impart a higher friction coefficient than organic films, and it is thus necessary to conduct a heat treatment at a high temperature for forming a more stable protective film. In addition, in the case where heat treatment is conducted at a high temperature, there is a problem that the friction coefficient further increases. Hence, the stability of the friction coefficient of the fastening member is not sufficient for use.

SUMMARY OF INVENTION

Therefore, an object of the present invention is to provide a top coating agent that imparts a beautiful silvery-white appearance, can be adjusted to suppress an increase in friction coefficient even when heat-treated at a high temperature, stabilizes slidability, and forms a protective film strong and excellent in water resistance, corrosion resistance, and the like, and a fastening member having a protective film formed using this top coating agent.

The present invention provides a top coating agent described below, and a silvery-white fastening member having a protective film formed using this top coating agent.

[1] A top coating agent comprising:
  a polyoxyalkylene amine-based surfactant, a water-soluble modified organopolysiloxane, aluminum flakes, and a diluent containing water.

[2] The top coating agent according to [1], wherein
  the polyoxyalkylene amine-based surfactant is a polyoxyalkylene amine-based surfactant represented by the following formula:

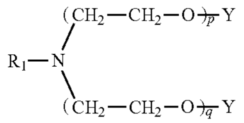

(I)

wherein $R_1$ represents a hydrogen atom or a linear or branched alkyl group or alkenyl group having 1 to 22 carbon atoms, Y each represent a hydrogen atom or a linear or branched alkyl group or acyl group having 1 to 4 carbon atoms, p represents an integer of 1 to 30, and q represents an integer of 0 to 30.

[3] The top coating agent according to [2], wherein
  the number of EO moles added (p+q) of the polyoxyalkylene amine-based surfactant is 30 or more.

[4] The top coating agent according to any one of [1] to [3], wherein
  the diluent further contains at least one of water-soluble glycol ethers and water-soluble alcohols.

[5] The top coating agent according to any one of [1] to [4], wherein
  a content of the polyoxyalkylene amine-based surfactant is 20 to 150 g/L.

[6] The top coating agent according to any one of [1] to [5], wherein
  the aluminum flakes are aluminum flakes coated with silica.

[7] The top coating agent according to any one of [1] to [6], that is to be formed on a hexavalent chromium-free trivalent chromium chemical conversion film or a chromium-free chemical conversion film to adjust a friction coefficient.

[8] A silvery-white fastening member comprising, on a surface of a metal base plated with zinc:
  a hexavalent chromium-free trivalent chromium chemical conversion film; and
  a silvery-white protective film on the hexavalent chromium-free trivalent chromium chemical conversion film, wherein
  the silvery-white protective film is a protective film formed using the top coating agent according to any one of [1] to [7].

[9] A method for producing a silvery-white fastening member, comprising:
  coating a fastening member in which a hexavalent chromium-free trivalent chromium chemical conversion film is formed on a surface of a metal base plated with zinc, with the top coating agent according to any one of [1] to [7], followed by heating and drying at a temperature of 80° C. or more.

The present invention makes it possible to provide a top coating agent that imparts a silvery-white appearance, can be adjusted to suppress an increase in friction coefficient even when heat-treated at a high temperature, stabilizes slidability, and forms a protective film strong and excellent in water resistance, corrosion resistance, and the like, and a fastening member having a protective film formed using this top coating agent.

DESCRIPTION OF EMBODIMENTS

A silvery-white top coating agent of the present invention comprises a polyoxyalkylene amine-based surfactant, a water-soluble modified organopolysiloxane, aluminum flakes, and a diluent containing water.

In the top coating agent of the present invention, the polyoxyalkylene amine-based surfactant is used as a friction modifier. The polyoxyalkylene amine-based surfactant is preferably a polyoxyalkylene amine-based surfactant represented by the following formula (1):

(I)

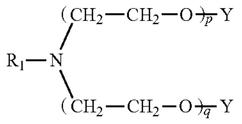

wherein $R_1$ represents a hydrogen atom or a linear or branched alkyl group or alkenyl group having 1 to 22 carbon atoms, and preferably represents a linear or branched alkyl group or alkenyl group having 8 to 18 carbon atoms. Y each represent a hydrogen atom or a linear or branched alkyl group or acyl group having 1 to 4 carbon atoms, and preferably represents a hydrogen atom. p represents an integer of 1 to 30, q represents an integer of 0 to 30, preferably p+q represents an integer of 2 to 60, and more preferably p+q represents an integer of 30 to 60. The polyoxyalkylene amine-based surfactant includes polyoxyethylene tallow amine, polyoxyethylene coconut oil alkyl amine, polyoxyethylene stearylamine, polyoxyethylene laurylamine, polyoxyethylene myristylamine, polyoxyethylene pentadecylamine, polyoxyethylene palmitylamine, polyoxyethylene margarylamine, polyoxyethylene oleylamine, polyoxyethylene vaccenylamine, polyoxyethylene arachidylamine, polyoxyethylene behenylamine, and the like. Note that the polyoxyethylene amine-based surfactants represented by the formula (1) are commercially available, such as "Newcol 405" and "Newcol 410" produced by Nippon Nyukazai Co., Ltd., "Pionin D-3104" and "Pionin D-3110" produced by TAKEMOTO OIL & FAT Co., Ltd., and "Ethomeen T/15" and "Ethomeen T/25" produced by Lion Corporation, for example. One of polyoxyalkylene amine-based surfactants, or two or more of them in combination, may be used. The concentration of the polyoxyalkylene amine-based surfactant in the top coating agent is preferably within a range of 20 to 150 g/L, and more preferably within a range of 40 to 80 g/L. If the concentration of the polyoxyalkylene amine-based surfactant is less than 20 g/L, the effect to adjust the friction coefficient becomes insufficient, while if the concentration of the polyoxyalkylene amine-based surfactant is more than 150 g/L, the water resistance or the corrosion resistance of the film itself formed using the top coating agent tends to deteriorate. Note that another publicly-known friction modifier may be used together as the friction modifier as long as the friction modifier does not hinder the effects of the friction modifier of the present invention.

The water-soluble modified organopolysiloxane is a modified organopolysiloxane in which a hydrophilic segment is bonded to a silicon atom of a terminal or side chain of an organopolysiloxane segment. The hydrophilic segment includes polyalkylene glycols, polyalkylene glycol monoalkyl ethers, N-acylalkyleneimine, acrylic acid, vinyl alcohol, and the like, but is preferably a polyalkylene glycol, and particularly preferably propylene glycol. Hence, the water-soluble modified organopolysiloxane is preferably a polyoxyalkylene-modified organopolysiloxane, and particularly preferably polyoxypropylene-modified organopolysiloxane (polypropylene glycol-modified organopolysiloxane). Such a polysiloxane can be easily obtained as polypropylene glycol-modified silicone of a commercial product. One of water-soluble modified organopolysiloxanes, or two or more of them in combination, may be used. The concentration of the water-soluble modified organopolysiloxane in the top coating agent is preferably within a range of 50 to 450 g/L, and more preferably within a range of 150 to 350 g/L.

The major component of the diluent is water. In addition, the top coating agent can be used by diluting the top coating agent to an appropriate concentration by using, for example, water and a water-soluble organic solvent, and, for example, water and butyl cellosolve, for reasons of painting workability, storability, printed film thickness adjustment, and the like as in the case of normal paints. For example, the concentration of the top coating agent in the top coating agent diluted solution is 30 to 100 wt %, and preferably 50 to 80 wt %.

Diluents other than water include water-soluble glycol ethers, water-soluble alcohols, and the like. The water-soluble glycol ethers are preferably alkylene glycol alkyl ethers, and include, for example, monoalkylene glycol monoalkyl ethers and monoalkylene glycol dialkyl ethers, and are more preferably ethylene glycol monoalkyl ethers (cellosolves). Specifically, ethylene glycol monoalkyl ethers include, for example ethylene glycol monomethyl ether (methyl cellosolve), ethylene glycol monoethyl ether (ethyl cellosolve), ethylene glycol monobutyl ether (butyl cellosolve), propylene glycol monomethyl ether (2-methoxy-1-propanol, 1-methoxy-2-propanol, and the like), butylene glycol monomethyl ether (2-methoxy-1-butanol, 3-methoxy-1-butanol, 1-methoxy-2-butanol, and the like), diethylene glycol monomethyl ether, triethylene glycol monomethyl ether, ethylene glycol dimethyl ether (dimethyl cellosolve), ethylene glycol diethyl ether (diethyl cellosolve), and the like. Among these, ethylene glycol monobutyl ether and butylene glycol monomethyl ether are particularly preferable. One of the above water-soluble glycol ethers, or two or more of them in combination, may be used. The concentration of the water-soluble glycol ether in the top coating agent is preferably within a range of 50 to 400 g/L, and more preferably within a range of 200 to 300 g/L.

The water-soluble alcohols include methanol, ethanol, 1-propanol, isopropyl alcohol, 2-butanol, ethylene glycol, propylene glycol, 1,3-propanediol, 1,2-butanediol, 1,3-butanediol, 1,4-butanediol, 2,3-butanediol, 1,5-pentanediol, 1,2-pentanediol, glycerin, 1,2,4-butanetriol, 1,2,5-pentanetriol, 1,2,6-hexanetriol, and the like. One of the water-soluble alcohols, or two or more of them in combination, may be used. The concentration of the water-soluble alcohol in the top coating agent is preferably within a range of 50 to 400 g/L, and more preferably within a range of 200 to 300 g/L.

The aluminum flakes are used as a coloring agent in the solution of the top coating agent of the present invention. The average particle size of the aluminum flakes is preferably 1 to 50 μm, and more preferably 5 to 10 μm, as measured by the laser diffraction scattering method. In addition, the average thickness of the aluminum flakes is preferably 0.05 to 0.5 μm, and more preferably 0.1 to 0.3 μm, as obtained through electron microscopic observation. Moreover, as the aluminum flakes, silica-coated aluminum with surfaces coated with silica is preferably used. The thickness of the silica with which the surfaces are coated is preferably 50 nm or less. As the silica-coated aluminum, commercial products such as "Hydrolan series" (trade name, manufactured by ECKART GmbH) and "ALPASTE EMR series" (trade name, manufactured by Toyo Aluminium K.K.) can be used. The concentration of the coloring agent component in the solution of the silvery-white top coating agent is preferably within a range of 2 to 25 wt %.

In the present invention, a silvery-white protective film can be obtained by immersing a member in the above top coating agent and then draining the top coating agent very well by centrifugation, or spray-coating the member with the top coating agent, and thereafter sufficiently drying the film. The centrifugal drainage is preferably conducted at 200 to 1000 rpm. In addition, the drainage time is preferably 2 to 5 minutes. The drying temperature is preferably 80 to 220° C. In addition, the drying time is preferably 10 to 60 minutes. If the drying temperature is lower than this drying temperature range, the corrosion resistance decreases, and also if the drying temperature is too high as well, the corrosion resistance decreases. If the drying time is shorter than 10 minutes, the corrosion resistance decreases. In addition, if the drying time is too long, it is not economical. In addition, as the method for drying the silvery-white protective film, a two-stage drying method that includes conducting preliminary drying and then main drying is preferable. The preliminary drying is preferably conducted at a drying temperature 30° C. to 80° C. for a drying time of 3 to 60 minutes, and the main drying is preferably conducted at a drying temperature of 100° C. to 220° C. for a drying time of 10 to 60 minutes. Conducting the preliminary drying at 80° C. or less is preferable because this makes it possible to prevent film defects such as breakage or attachment failure of the film from occurring due to shrinkage of the film during a high-temperature drying.

A silvery-white fastening member of the present invention comprises, on a surface of a metal base plated with zinc: a hexavalent chromium-free trivalent chromium chemical conversion film; and a silvery-white protective film on the hexavalent chromium-free trivalent chromium chemical conversion film. The silvery-white fastening member includes bolts, screws, nuts, washers, flat-plate members (stays, base plates), and the like, and also includes joint pipe members, hose bands, and the like.

The metal base used in the present invention includes bases of various metals such as iron, nickel, copper, and aluminum, alloys of these, and metals such as aluminum and alloys processed with zinc conversion process.

The above metal base is plated with zinc by a conventional method. To deposit zinc plating on the base, any of acidic or neutral baths such as a sulfuric acid bath, a fluoborate bath, a potassium chloride bath, a sodium chloride bath, and an ammonium chloride eclectic bath, and alkaline baths such as a cyanide bath, a zincate bath, and a pyrophosphoric acid bath may be used, and especially a zincate bath is preferable. In addition, the thickness of the zinc plating to be deposited on the base may take any desired value, but is preferably 1 μm or more, and more preferably 5 to 25 μm.

In the present invention, after the zinc plating is deposited on the base, pretreatments, for example, washing with water, or after washing with water, activation treatment with nitric acid is conducted as necessary, and then chemical conversion treatment is conducted, for example, by a method such as immersion treatment by using a treatment solution for chemical conversion for forming hexavalent chromium-free trivalent chromium chemical conversion film.

The hexavalent chromium-free trivalent chromium chemical conversion film is formed by using a treatment solution for hexavalent chromium-free trivalent chromium chemical conversion having a Zn ion concentration of 20 g/L or less. The amount of chromium ions attached in the hexavalent chromium-free trivalent chromium chemical conversion film is 0.1 to 2.0 mg/dm$^2$, and preferably 0.2 to 1.5 mg/dm$^2$. By setting the amount of chromium ions attached within such a range, it is possible to achieve high corrosion resistance with excellent appearance.

In addition, the thickness of the silvery-white protective film is preferably 0.1 to 10 μm. By setting the thickness within such a range, it is possible to achieve high corrosion resistance with excellent silvery-white appearance, and also it is possible to prevent generation of a pool of the liquid or stain, and a decrease in dimensional precision.

In the present invention, the trivalent chromium chemical conversion treatment film on the surface of a metal base can be formed by bringing the surface of a metal base plated with zinc into contact with the above treatment solution for trivalent chromium chemical conversion to form the trivalent chromium chemical conversion treatment film, for example, on the zinc plating. As the method for bringing the surface of a metal base plated with zinc into contact with the above treatment solution for trivalent chromium chemical conversion, for example, the metal base plated with zinc is immersed in the treatment solution for trivalent chromium chemical conversion in general. For example, the metal base is favorably immersed at a solution temperature of 10 to 40° C. for 5 to 600 seconds, and is more preferably immersed for 15 to 120 seconds. Note that in zinc plating, in order to increase the gloss of the trivalent chromium chemical conversion treatment film, the product to be treated is generally immersed in a diluted nitric acid solution before the trivalent chromium chemical conversion treatment. In the present invention, such pretreatment may be used, or does not have to be used. Conditions and treatment operation other than the above can be carried out in accordance with a conventional chromate conversion treatment method.

The above silvery-white protective film is formed by immersing a fastening member in a solution of a silvery-white top coating agent comprising a polyoxyalkylene amine-based surfactant, a water-soluble modified organopolysiloxane, aluminum flakes, and a diluent containing water, or spray-coating the fastening member with the solution.

Next, the present invention will be described with reference to Examples and Comparative Examples; however, the present invention is not limited to these.

EXAMPLES

Examples 1 to 14 and Comparative Examples 1 to 6

(Preparation of Topcoat Agents)

Topcoat agents were prepared in accordance with the respective composition ratios described in Tables 1 to 4.

The water-soluble modified organopolysiloxane was dissolved in water to prepare an aqueous solution, and the friction modifier was mixed with this aqueous solution. At this time, the polyoxyalkylene amine-based surfactant, which was solid at ordinary temperature, was mixed in the state of being melted in a warm bath. As the coloring agent for obtaining silvery-white appearance, an aluminum paste containing silica-coated aluminum flakes "ALPASTE EMR-D5660" (trade name, produced by Toyo Aluminium K.K.) was mixed. The solid component of the silica-coated aluminum flakes in the aluminum paste was 50 wt %. Moreover, the diluent was mixed to obtain a top coating agent. Note that the polyoxyethylene tallow amine, polyoxyethylene stearylamine, polyoxyethylene laurylamine as the friction modifiers are represented by the formula (1), and p+q of each was a value shown in Tables 1 to 3.

TABLE 1

| Composition of the top coating agent (g/L) | | | | | | |
|---|---|---|---|---|---|---|
| | Example 1 | Example 2 | Example 3 | Example 4 | Example 5 | Example 6 |
| Polypropylene glycol-modified silicone (water-soluble modified organopolysiloxane) | 200 | 200 | 200 | 200 | 200 | 200 |
| Polyoxyethylene tallow amine (p + q = 40) (friction modifier) | 60 | 20 | 40 | 80 | 100 | 150 |
| Aluminum paste (coloring agent) | 100 | 100 | 100 | 100 | 100 | 100 |
| Water (diluent) | 450 | 450 | 450 | 450 | 450 | 450 |
| Butyl cellosolve (diluent) | 190 | 230 | 210 | 170 | 150 | 100 |

TABLE 2

| Composition of the top coating agent (g/L) | | | | | | |
|---|---|---|---|---|---|---|
| | Example 7 | Example 8 | Example 9 | Example 10 | Example 11 | Example 12 |
| Polypropylene glycol-modified silicone (water-soluble modified organopolysiloxane) | 200 | 200 | 200 | 200 | 200 | 200 |
| Polyoxyethylene tallow amine (p + q = 40) (friction modifier) | | | | | 60 | 60 |
| Polyoxyethylene tallow amine (p + q = 30) (friction modifier) | 60 | | | | | |
| Polyoxyethylene tallow amine (p + q = 20) (friction modifier) | | 60 | | | | |
| Polyoxyethylene tallow amine (p + q = 10) (friction modifier) | | | 60 | | | |
| Polyoxyethylene tallow amine (p + q = 5) (friction modifier) | | | | 60 | | |
| Aluminum paste (coloring agent) | 100 | 100 | 100 | 100 | 100 | 100 |
| Water (diluent) | 450 | 450 | 450 | 450 | 640 | 450 |
| Butyl cellosolve (diluent) | 190 | 190 | 190 | 190 | | |
| Isopropyl alcohol (diluent) | | | | | | 190 |

TABLE 3

| Composition of the top coating agent (g/L) | | |
|---|---|---|
| | Example 13 | Example 14 |
| Polypropylene glycol-modified silicone (water-soluble modified organopolysiloxane) | 200 | 200 |
| Polyoxyethylene stearylamine (p + q = 45) (friction modifier) | 60 | |
| Polyoxyethylene laurylamine (p + q = 30) (friction modifier) | | 60 |
| Aluminum paste (coloring agent) | 100 | 100 |
| Water (diluent) | 450 | 450 |
| Butyl cellosolve (diluent) | 190 | 190 |

TABLE 4

| Composition of the top coating agent (g/L) | | | | | | |
|---|---|---|---|---|---|---|
| | Comparative Example 1 | Comparative Example 2 | Comparative Example 3 | Comparative Example 4 | Comparative Example 5 | Comparative Example 6 |
| Polypropylene glycol-modified silicone (water-soluble modified organopolysiloxane) | 200 | 200 | 200 | 200 | 200 | 200 |
| Polyoxyethylene tallow amine (p + q = 40) (friction modifier) | | | | | | 60 |
| Polyoxyethylene sorbitan monolaurate (friction modifier) | 60 | | | | | |
| Polyoxyethylene monolaurate (friction modifier) | | | 60 | | | |
| Polyoxyethylene dodecylphenyl ether (friction modifier) | | | | 60 | | |
| Poly(oxyethylene) tridecyl ether (friction modifier) | | | | | 60 | |
| Aluminum paste (coloring agent) | 100 | 100 | 100 | 100 | 100 | |
| Water (diluent) | 450 | 450 | 450 | 450 | 450 | 450 |
| Butyl cellosolve (diluent) | 190 | 250 | 190 | 190 | 190 | 290 |

(Total Friction Coefficient)

A bolt made of iron (screw size: M6×35) and plated with zinc in a thickness of 8 μm in a zincate bath (NZ-110 bath produced by Dipsol Chemicals Co., Ltd. was used) was used, was washed with water, was immersed in a nitric acid bath (5 mL/L) for 10 seconds, was further washed with water, and a trivalent chromium chemical conversion film was formed by using a treatment solution for trivalent chromium chemical conversion (ZT-444CS produced by Dipsol Chemicals Co., Ltd.: 70 mL/L, chemical conversion treatment conditions: at pH 2.3, at 30° C., for 40 seconds), followed by washing with water. Subsequently, the bolt was subjected to a centrifugal dehydrator (at 700 rpm for 3 minutes). Thereafter, the iron bolt on which the trivalent chromium chemical conversion film was formed was immersed in each top coating agent described in Tables 1 to 4 (immersion at 30° C. for 20 seconds), was subjected to the centrifugal dehydrator (at 700 rpm for 3 minutes), followed by drying (at 80 to 220° C. for 30 minutes) to form a silvery-white protective film.

For each bolt thus obtained, the total friction coefficient was measured by torque/clamp force testing in accordance with JIS B1084.

(Effect of Drying Conditions on Topcoat Agent)

In Example 1 using polyoxyethylene tallow amine (p+q=40) as a friction modifier, which was the polyoxyalkylene amine-based surfactant, an increase in total friction coefficient was suppressed even when heat treatment was conducted at a high temperature, as compared with Comparative Example 1 using polyoxyethylene sorbitan monolaurate.

TABLE 5

| Effect of drying conditions on the top coating agent | | | | | | |
|---|---|---|---|---|---|---|
| | | Drying conditions (30 minutes) | | | | |
| | | 80° C. | 150° C. | 180° C. | 200° C. | 220° C. |
| Total friction coefficient | Example 1 | 0.15 | 0.18 | 0.22 | 0.24 | 0.29 |
| | Comparative Example 1 | 0.16 | 0.27 | 0.34 | 0.37 | 0.39 |

Note:
The colors of all the top coating films were silvery-white.

(Relation Between Amount of Friction Modifier (Polyoxyalkylene Amine-Based Surfactant) Added and Total Friction Coefficient)

When the amount of the friction modifier added was increased, the total friction coefficient decreased.

TABLE 6

Relation between the amount of the friction modifier added and the total friction coefficient (drying conditions: at 200° C. for 30 minutes)

| | Amount of the friction modifier added (g/L) | Color of the top coating film | Total friction coefficient |
|---|---|---|---|
| Comparative Example 2 | 0 | silvery-white | 0.44 |
| Example 2 | 20 | silvery-white | 0.33 |
| Example 3 | 40 | silvery-white | 0.28 |
| Example 1 | 60 | silvery-white | 0.24 |
| Example 4 | 80 | silvery-white | 0.21 |
| Example 5 | 100 | silvery-white | 0.16 |
| Example 6 | 150 | silvery-white | 0.14 |

(Relation Between Number of EO Moles Added (p+q) of Friction Modifier (Polyoxyalkylene Amine-Based Surfactant) and Total Friction Coefficient)

When the number of EO moles added of the friction modifier is increased, the total friction coefficient decreased.

TABLE 7

Relation between the number of EO moles added of the friction modifier and the total friction coefficient (drying conditions: at 200° C. for 30 minutes)

| | Number of EO moles added (p + q) | Color of the top coating film | Total friction coefficient |
|---|---|---|---|
| Example 1 | 40 | silvery-white | 0.24 |
| Example 7 | 30 | silvery-white | 0.28 |
| Example 8 | 20 | silvery-white | 0.31 |
| Example 9 | 10 | silvery-white | 0.33 |
| Example 10 | 5 | silvery-white | 0.35 |
| Comparative Example 2 | — | silvery-white | 0.44 |

(Results of Examples 11 to 14 and Comparative Examples 3 to 6)

TABLE 8

Color of the top coating film and Total friction coefficient (drying conditions: at 200° C. for 30 minutes)

| | Color of the top coating film | Total friction coefficient |
|---|---|---|
| Example 1 | silvery-white | 0.24 |
| Example 11 | silvery-white | 0.24 |
| Example 12 | silvery-white | 0.26 |
| Example 13 | silvery-white | 0.24 |
| Example 14 | silvery-white | 0.25 |
| Comparative Example 3 | silvery-white | 0.39 |
| Comparative Example 4 | silvery-white | 0.41 |
| Comparative Example 5 | silvery-white | 0.39 |
| Comparative Example 6 | transparent color | 0.24 |

What is claimed is:

1. A top coating agent comprising:

a polyoxyalkylene amine-based surfactant, a water-soluble modified organopolysiloxane, aluminum flakes, and a diluent containing water.

2. The top coating agent according to claim 1, wherein the polyoxyalkylene amine-based surfactant is a polyoxyalkylene amine-based surfactant represented by the following formula:

(I)

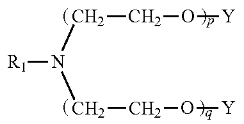

wherein $R_1$ represents a hydrogen atom or a linear or branched alkyl group or alkenyl group having 1 to 22 carbon atoms, Y each represent a hydrogen atom or a linear or branched alkyl group or acyl group having 1 to 4 carbon atoms, p represents an integer of 1 to 30, q represents an integer of 0 to 30, and at least one of p or q is at least 2.

3. The top coating agent according to claim 2, wherein the number of EO moles added (p+q) of the polyoxyalkylene amine-based surfactant is 30 or more.

4. The top coating agent according to claim 1, wherein the diluent further contains at least one of water-soluble glycol ethers and water-soluble alcohols.

5. The top coating agent according to claim 1, wherein a content of the polyoxyalkylene amine-based surfactant is 20 to 150 g/L.

6. The top coating agent according to claim 1, wherein the aluminum flakes are aluminum flakes coated with silica.

7. The top coating agent according to claim 1, that is to be formed on a hexavalent chromium-free trivalent chromium chemical conversion film or a chromium-free chemical conversion film to adjust a friction coefficient.

8. A silvery-white fastening member comprising, on a surface of a metal base plated with zinc:

a hexavalent chromium-free trivalent chromium chemical conversion film or a chromium-free chemical conversion film; and a silvery-white protective film on the hexavalent chromium-free trivalent chromium chemical conversion film or the chromium-free chemical conversion film, wherein the silvery-white protective film is a protective film formed using the top coating agent according to claim 1.

9. A method for producing a silvery-white fastening member, comprising:

coating a fastening member in which a hexavalent chromium-free trivalent chromium chemical conversion film or a chromium-free chemical conversion film is formed on a surface of a metal base plated with zinc, with the top coating agent according to claim 1, followed by heating and drying at a temperature of 80° C. or more.

* * * * *